W. WAFFENSCHMIDT.
DEVICE FOR INDICATING CURVES.
APPLICATION FILED DEC. 21, 1921.

1,417,703.

Patented May 30, 1922.
6 SHEETS—SHEET 1.

WITNESS:
G. V. Rasmussen

INVENTOR
WALTER WAFFENSCHMIDT
BY
ATTORNEYS

W. WAFFENSCHMIDT.
DEVICE FOR INDICATING CURVES.
APPLICATION FILED DEC. 21, 1921.

1,417,703.

Patented May 30, 1922.
6 SHEETS—SHEET 2.

WITNESS:
G. V. Rasmussen

INVENTOR
WALTER WAFFENSCHMIDT
BY
Briesen Schrenck
ATTORNEYS

UNITED STATES PATENT OFFICE.

WALTER WAFFENSCHMIDT, OF KARLSRUHE, GERMANY.

DEVICE FOR INDICATING CURVES.

1,417,703.  Specification of Letters Patent.  Patented May 30, 1922.

Application filed December 21, 1921. Serial No. 523,937.

*To all whom it may concern:*

Be it known that I, WALTER WAFFENSCHMIDT, a citizen of Germany, and resident of Karlsruhe, Baden, Germany, have invented certain new and useful Improvements in Devices for Indicating Curves (for which I have filed application in Germany, October 9, 1919), of which the following is a specification.

My invention relates to a device intended primarily for use on railroads for the purpose of either ascertaining the condition of curves as existing on the track or of correcting existing curves or of laying out the curves correctly at the time of building the track. The device, however, may be utilized in other cases where the curvature of a line rail or other body is to be determined.

Several satisfactory embodiments of my present invention are illustrated by the accompanying drawings, in which Figs. 9 and 10 are vertical sections on lines 9—9 and 10—10, respectively, of Fig. 11, which latter is a plan of the intermediate member employed in connection with the end members shown in Figs. 6, 7 and 8; Fig. 12 is a diagrammatic plan view of still another form of my invention.

Figures 1, 2:
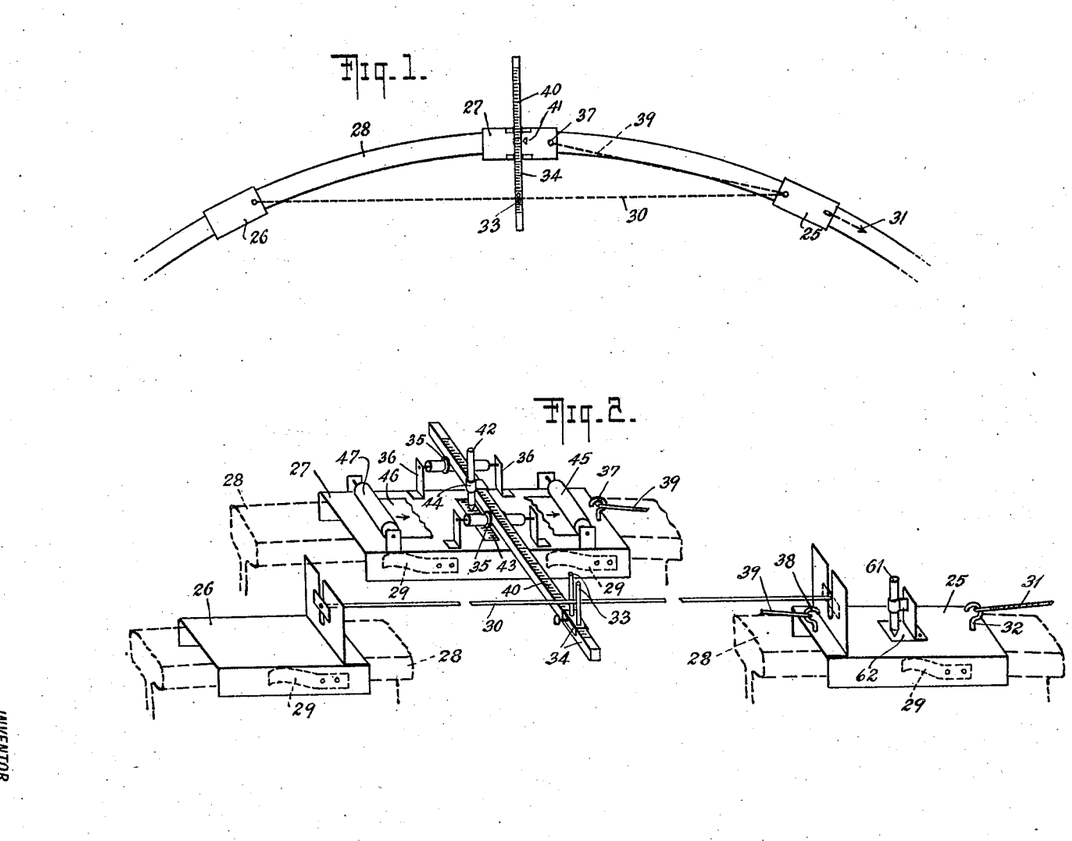
Figure 1 is a diagrammatic plan view showing one form of my improved device in connection with a track rail.
Fig. 2 is a perspective view showing the said device more in detail.

As illustrated by Figs. 1 and 2, the improved device comprises two end members 25 and 26 respectively, and an intermediate member 27, all three constructed as slides of inverted U-shape in cross-section adapted to straddle the head 28 of a rail and to slide lengthwise thereof. In order to hold the said members or slides on the rail head with sufficient firmness, I may provide springs such as indicated at 29 secured to the said three members and adapted to bear against the side surface of the rail head. A cord, wire or other suitable connecting member 30 extends from the front member 25 to the rear member 26 and causes the rear member to follow said front member when the latter is pulled forward, for instance, by means of a rope 31 attached to a hook 32. The connecting member 30 is rectilinear or substantially so, and passes between upright pins 33 which project upwardly from an indicating member 34 carried by the intermediate member 27 and movable transversely thereof, for which purpose said indicating member may move on flanged rollers 35 journalled in brackets 36 carried by said intermediate member 27.

In order to cause the intermediate member 27 to follow the member 25 as the latter is pulled forward, hooks 37, 38 respectively are provided at the adjacent ends of said members 27, 25 and a cord or wire 39 has its respective ends attached to said hooks. It will be understood that as the instrument consisting of the parts described is pulled along the rail 28, the connecting member 30, by its engagement with the pins 33, will cause the indicating member 34 to move transversely on the intermediate member 27 whenever the curvature of the rail changes. If, therefore, the indicating member 34 is provided with a scale, as shown at 40, and the intermediate member 27 with a corresponding mark or index 41, the altitude of the arc will be indicated by said scale and index. Another way of obtaining this indication is shown in Fig. 2, where a pointer 42 is secured to the indicating member 34 to register with the graduations of a scale 43 arranged transversely on the intermediate member 27. The pointer 42 may also be constructed as a marker adapted to produce a suitable mark on the head of the rail; for this purpose the scale 43 would be set removably in a suitable opening of the member 27 so that after removing said scale the pointer could be lowered sufficiently through said opening to come in contact with the head of the rail. The pointer is shown as a rod slidable up and down in a suitable socket or clamp 44. In some cases it may be desirable to obtain a graphic record of the condition of the track. For this purpose the pointer 42 may be caused to produce a continuous mark or line upon a piece of paper or other suitable material fed lengthwise of the intermediate member 27 and in contact with the lower end of said pointer. In Fig. 2 I have indicated a front roll 45 on which the strip of paper 46 winds, said paper coming from a rear roll 47. The axes of the rolls 45, 46 extend transversely, that is to say, parallel, to the indicating member 40.

Figure 3:
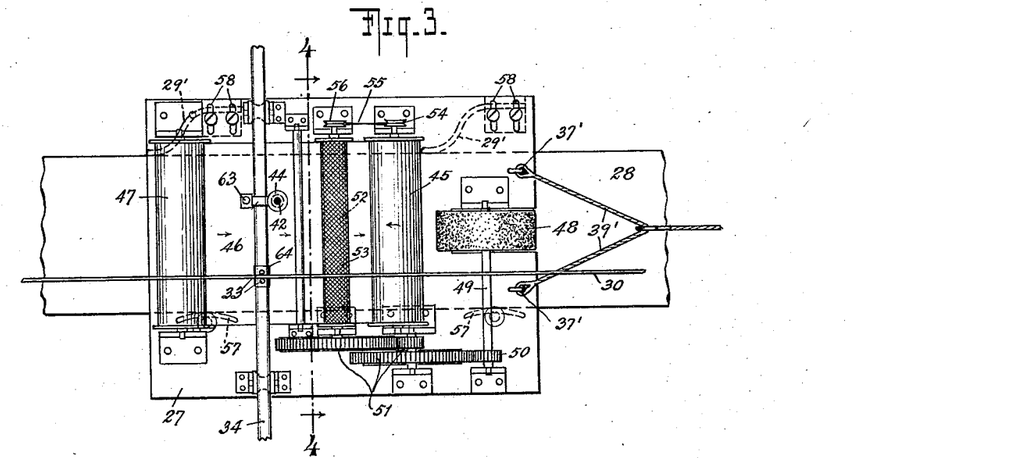
Fig. 3 is a plan view showing one form of one of the members of the improved device.
Figure 4:
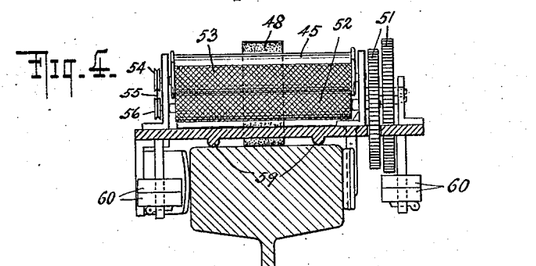
Fig. 4 is a vertical section on line 4—4 of Fig. 3.
Figure 5:
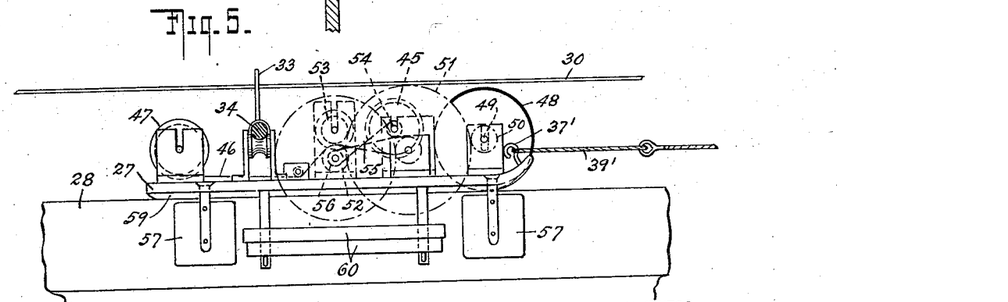
Fig. 5 is a side elevation of the parts shown in Fig. 3.

Any suitable means may be employed for feeding the strip of paper lengthwise, as indicated by the arrows. A suitable mechanism for this purpose is shown in Figs. 3, 4 and 5. Here the intermediate member 27 carries a roller 48 mounted on a transverse shaft 49 adapted to engage the upper surface of the rail head 28 to be rotated thereby as the instrument is drawn along the track. In order to increase friction the periphery of this roller 48 is preferably lined with rubber and the roller itself is made of sufficient weight to bear strongly against the head of the rail, the roller being also movable up and down so that its weight will rest on the rail head and not on the inner bearing of the shaft 49. Near its outer bearing said shaft carries a pinion 50 which, by means of a train of gearing 51, actuates a paper feed roller 52, the surface of which is preferably corrugated lengthwise or otherwise roughened. The paper passes between this feed roller 52 and an upper opposing roller 53, which is guided in vertical slots so that its weight will bear on the paper to press the latter against the feed roller 52. The periphery of the upper roller 53 is preferably also roughened. The roller 45 on which the paper is wound is made with a pulley 54 which, by means of a crossed belt or rope 55, is driven from a similar pulley 56 connected with the feed roller 52.

Figs. 3 to 5 also show the intermediate member provided with rounded lugs 57 adapted to engage the rail head at one side and with springs 29' adapted to engage the rail head at the other side. These springs are adjustable transversely of the intermediate member 27, as indicated at 58, so that the distance between the springs 29' and the lugs 57 may be adjusted according to the width of the rail head. Fig. 4 also shows the top plate of the intermediate member as provided with runners 59 arranged to engage the upper surface of the rail head. Instead of a single traction member 39, such as shown in Figs. 1 and 2, Fig. 3 indicates two traction members 39' secured at 37', the forward ends of said traction members converging and being secured to the front member 25 as before. Figs. 4 and 5 further indicate removable weights 60 which serve to press the entire member or slide down upon the rail so as to hold it in position. It will be understood that the roller 47 from which the paper unwinds will be provided with a suitable tension device.

In addition to providing a pointer or marker such as 42 on the intermediate member 27, I may arrange a pointer or marker on one or both of the end members 25, 26. Thus Fig. 2 shows a marker 61 on the front member 25, which has an opening 62 through which the marker may indicate and mark on the head of the rail 28.

The device may be used in various ways. For instance, it may be employed to obtain a continuous graphic record of the track curvature by causing the marker 42 to trace a line on the record strip 46 while the latter is fed from the roll 47 to the roll 45 and while the entire instrument is being drawn along the track, preferably by a man walking slowly, for instance at a pace of about 100 yards a minute. The line thus traced will thus indicate, for every point of the track portion over which the instrument has traveled, the exact altitude of the segment subtended by the chord formed by the rectilinear connecting member 30. When it is not desired to obtain an automatic, graphic record, the strip 46 is removed and readings are taken at regular intervals (for instance every five yards) by means of the scale 40 and index 41, or by means of the pointer 42 and the scale 43. Again, the instrument may be used to test or determine whether a track portion has the proper direction or curve, and for this purpose it should be possible to set the marker 42 at different distances from the guide pins 33. This can be accomplished readily by making the part which carries the marker socket 44 or the part carrying the pins 33, or both of said parts, as slides adjustable lengthwise of the body of the indicating member 34 and adapted to be locked in position thereon; thus, I have shown a clamping screw 63 for locking at any desired point the slide 64 which carries the pins 33. If, for instance, it is desired to test whether a certain curved portion of the track has the proper radius, a simple calculation (or reference to a table) will show what the proper altitude of the segment subtended by the chord 30 should be in that case; the distance between the chord or connecting member 30 (center between the pins 33) and the marker 42 will be set to correspond to this altitude, and the instrument will be drawn along the curved rail portion to be tested. If the curvature is uniform, there will be no transverse motion of the indicating member 34 relatively to the intermediate member 27. Moreover, any deviation from the proper curvature can be noted and measured by means of the scale 40 and index 41, or scale 43 and pointer 42. Furthermore, such deviation can be marked on the upper surface of the rail by removing the scale 43 and bringing the lower end of the marker 42 against such rail surface. This will produce a line on top of the rail head, and as long as the rail has the proper curve, this line will remain in the longitudinal center of the rail, but any departure from the proper curve will be indicated by a deviation of the marked line from the longitudinal center of the rail head. In order to be able to determine more readily whether the line produced by the marker 42 is in the longitudinal center of the rail head, I may mark such longitudinal center, for instance, by the marker 61 carried by the front member 25. In this case, as long as the rail has the proper curvature, the two lines traced by the markers 61 and 42 will coincide, but wherever the rail deviates from the proper curve, the said two lines will be apart more or less, and the amount and direction of such deviation can be observed and measured accurately.

It will be obvious that the instrument can be used not only for ascertaining and, if desired, recording graphically the condition of a track rail, but also as a gauge to obtain the proper direction or curvature of a rail during the construction of a track, or during subsequent corrections.

The instrument shown in Figs. 1 to 5 is arranged to travel in one direction only; that is, the member 25 is always the forward member and when it is desired to proceed along the track in the opposite direction, it is necessary to lift the instrument off the rail and reverse it end for end, so that the member 25 will again be the forward member. In Figs. 7 to 17 I have shown two forms of my invention which do not require this reversal, but may be drawn along the track in either direction as they are; that is to say, each of the end members may be either the front member or the rear member of the instrument.

Figure 6:
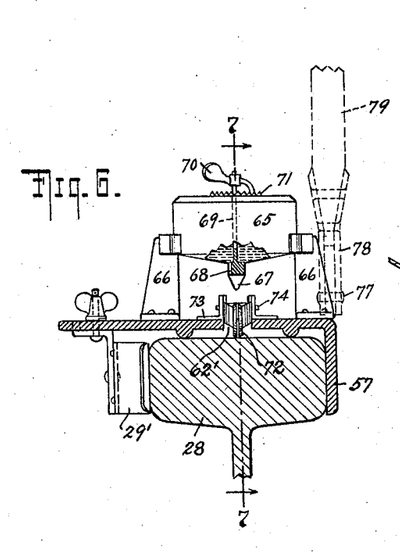
Figs. 6 and 7 are vertical sections on lines 6—6 and 7—7, respectively, of Fig. 8.
Figure 7:
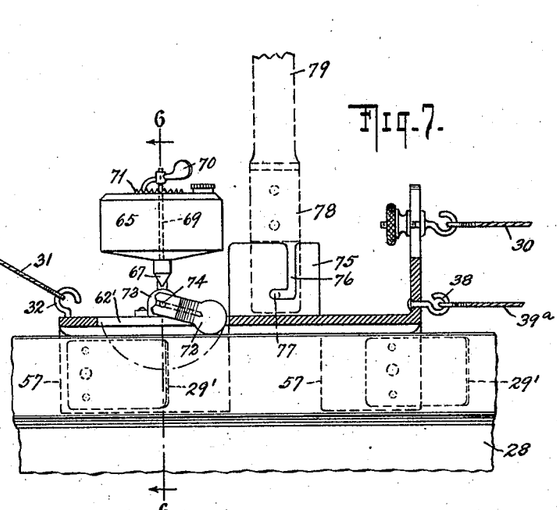
Figure 8:
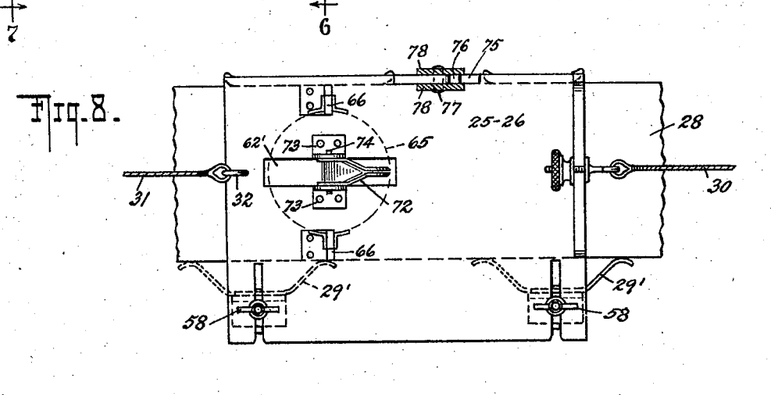
Fig. 8 is a corresponding plan view showing the end member of another form of my invention.
Figures 9, 10, 11, 12:
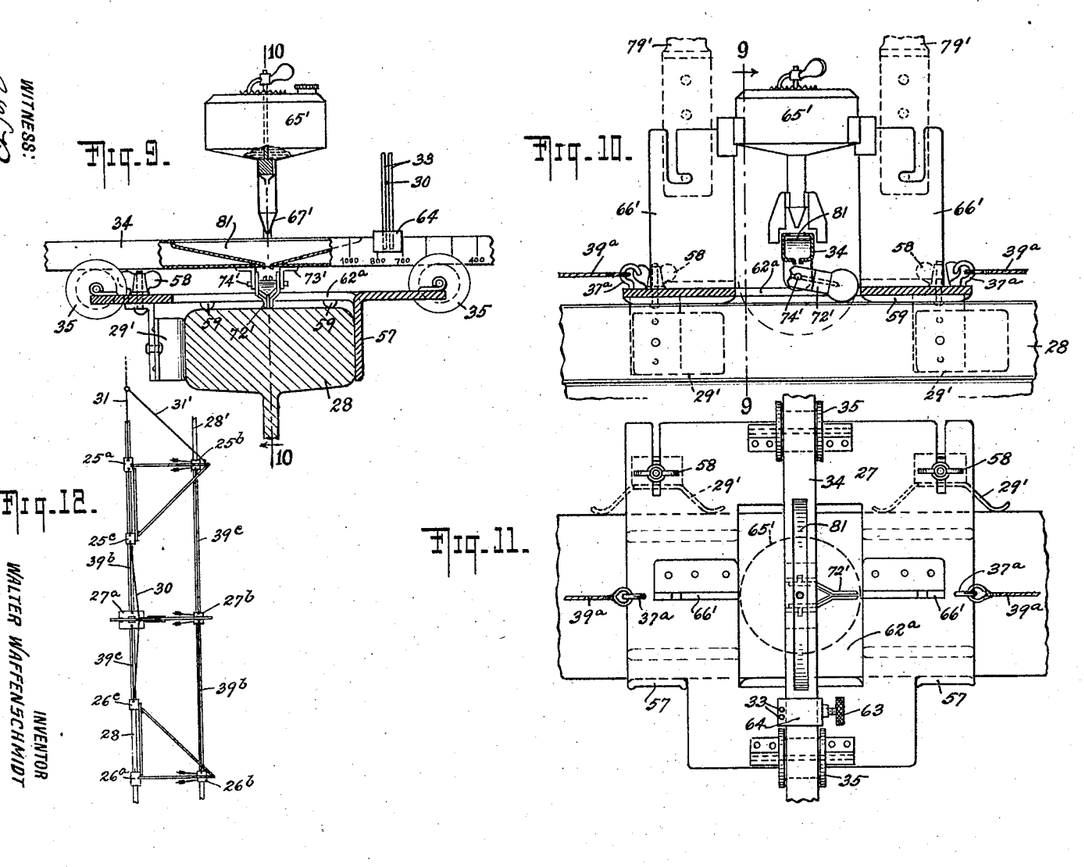
Figures 13, 14:
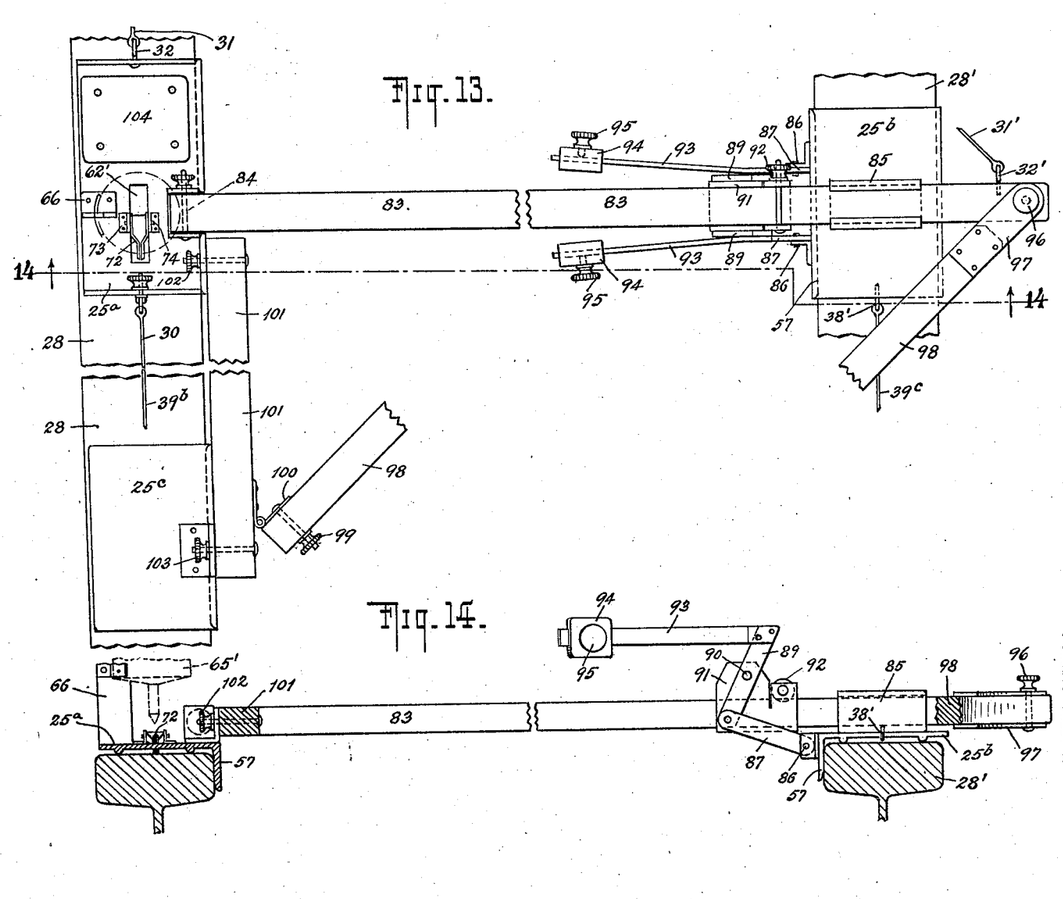
Fig. 13 is a plan view of the front end member shown in Fig. 12.
Fig. 14 is a vertical section of said end member on line 14—14 of Fig. 13.

In Figs. 6 to 11 I have shown a form of my invention which, like that illustrated by Figs. 1 to 5, travels on a single rail. Figs. 6, 7 and 8 illustrate one of the two end members 25, 26 (which are alike in this case), and Figs. 9, 10 and 11 show the intermediate member 27. The means for causing these members to properly straddle the rail as they slide along the same are practically the same as described with reference to Figs. 3 to 5, as will be understood by the use of corresponding reference numerals. Instead of the marker 61 of Fig. 2, I employ the following marking device, working through the opening 62' of the end member 25 or 26: A reservoir or tank 65 containing a suitable marking fluid is supported on brackets 66 and has a discharge spout 67 controlled by a valve 68 which can be closed or opened more or less and locked in adjusted positions by any suitable means, for instance a rod 69, a handle 70 and locking teeth 71. The liquid dropping from the spout 67 passes into the upper end of a trough or gutter 72, which contracts toward its lower end, at which its side walls are quite close together so as to hold the marking fluid and deliver it only in sufficient amount to mark a line on the head of the rail 28 in the longitudinal center of said head. The trough is pivoted, brackets 73 secured to the member 25 or 26, allowing said trough to swing about an axis 74 extending transversely of said member. Thus, the trough can swing up and down to remain in contact with the rail notwithstanding irregularities in the rail surface or in the motion of said end member 25 or 26. Generally, the valve 68 will be closed on one of the members 25, 26, preferably the member which at the time is the rear member. The opening 62' is of sufficient length to allow the trough 72 to be swung to either end of such opening, and it ought to be brought to such a position that the pivot 74 will be ahead, in the direction in which the instrument moves, of the lower end of the trough. Thus, in Figs. 7 and 8 the trough has been shown at the right-hand end of the opening 62', it being assumed that the instrument is being pulled toward the left by the traction member 31; that is, the member shown in these figures is, at that time, the forward member. Should the direction of movement be reversed, so that the end member shown in Figs. 6, 7 and 8 would be the rear member, (in which case there would be no traction member 31 connected with the hook 32 of said end member), the trough 72 would be reversed, as indicated by the dotted arc in Fig. 7, to bring its marking end to the left of the pivot axis 74. Of course, the member 25 or 26 would have to be raised at the end carrying the brackets 73 sufficiently to allow the trough to clear the head of the rail as the trough is swung to the new position, but it would not be necessary to lift the end member 25 or 26 off the rail entirely. It will be evident that the reversing of the trough will also invert it, and in order that the trough and marker may work equally well in either position, it is constructed as a double trough, with a bottom or partition running from one side wall of the trough to the other about half-way between the upper and the lower edges of said side walls. The upper end of this partition runs slightly beyond the axis 74 and the outlet of the spout 67 so that in either position of the trough the fluid will drop from said spout on the upper end of the partition or trough bottom. This partition extends downwardly only to the lower end of the converging portions of the side walls; that is to say, there is no partition between the parallel lower ends of the side walls, which ends are preferably rounded as shown in Fig. 7 so as to better ride on the rail.

At the side of the end member 25, 26 having the lugs 57 I have shown an upright bracket 75 having a bayonet slot 76 for receiving the lower pin 77 on the forked lower end 78 of a rod or bar 79 (usually about 3 feet high) also having another pin 80 adapted to lie close to the upper edge of said bracket. This rod may be attached and detached readily and serves the purpose of enabling an operator to control and maintain the horizontal position of the device.

The intermediate member 27 shown in Figs. 9, 10 and 11 is similar, in its general features, to the end members represented in Figs. 6, 7 and 8. The following parts are of somewhat different arrangement. The brackets 66' carrying the tank 65' are not located at opposite sides of the member (as are the brackets 66, Fig. 8), but in longitudinal alignment in the center of the member 27. These brackets 66' are also employed as supports for rods 79' similar in construction and function to the rod 79 of the end member 25 or 26. The brackets 73' to which the trough 72' is pivoted at 74' are carried, not by the member 27, but by the transversely-movable indicating member 34, so that the lower, marking end of the trough 72' moves not only lengthwise of the rail, in unison with the intermediate member 27, but also transversely of the rail, in unison with the indicating member 34. The top of the intermediate member 27 is provided with an opening 62$^a$ of sufficient size to allow the trough 72' to move transversely, as just referred to, and also to be reversed from one side of the indicating member or the other in the same manner as described above with reference to the trough 72. It will be understood that the trough 72' will be swung to such a position that its point of contact with the rail 28 will be in the rear of the pivot 74' with reference to the direction in which the instrument travels lengthwise of the rail. The marking fluid issuing from the spout 67' drops into the open upper end of a funnel 81 carried by the indicating member 34 and built into the same, said upper end being of sufficient length so that, in all positions of the indicating member, the spout 67' will be in registry with some portion of said open upper end. The discharge end 82 at the bottom of the funnel 81 is always in registry with the upper end of the marking trough 72'. The intermediate member in this construction has hooks 37$^a$ at each end for connection with the wires 39$^a$, one of which extends to the hook 38 of the end member 25, and the other to the like hook of the end member 26, it being understood that these members 25, 26 are mounted on the rail 28, with the intermediate member 27 between them as in Fig. 1, and with the hooks 38 at those ends of the members 25, 26 which are nearest to such intermediate member.

The operation of the form of my invention illustrated by Figs. 6 to 11 is the same as described above with reference to Figs. 1 to 5. While no recording device (such as 46) has been shown in Figs. 9 to 11, it will be obvious that a recording device of the same character as indicated in Figs. 2 to 6 (or of any other suitable character), might be added to the parts shown in Figs. 9, 10 and 11, so that the trough 72', instead of marking a line on the head of the rail 28, would trace a record line on a traveling sheet or strip of paper such as 46.

The form of my invention illustrated by Figs. 12 to 16 has its two end members and its intermediate member constructed to travel on both rails of a track instead of only one rail. This third form of my invention, like the second form, is adapted to travel on the track in either direction, without reversal. The marking mechanisms described in connection with Figs. 6 to 11 are employed, without any material difference, in the instrument shown in Figs. 12 to 16, as well as other features which will be identified readily owing to the use of corresponding reference numerals.

The front member comprises three sections or slides 25$^a$, 25$^b$, 25$^c$ of which the sections 25$^a$, 25$^c$ are arranged in tandem fashion and adapted to travel on the same rail 28, while the section 25$^b$, adapted to travel on the other rail 28', is arranged abreast of the section 25$^a$. A transverse bar 83 has one of its ends secured at 84 to the section 25$^a$, and adjacent to its other end said bar is fitted to slide in a transverse guide 85 of the section 25$^c$. The three sections have lugs 57 to engage the rails 28, 28' on the inside of the heads, no springs, such as 29, 29' being required in this construction. The section 25$^b$ is connected by two aligning, horizontal, longitudinal pivots 86 with transverse links 87, the other ends of which are connected pivotally at 88 with the lower ends of arms 89 fulcrumed at 90 upon a carrier 91, preferably constructed as a slide adjustable lengthwise of the bar 83, and suitably secured after adjustment, for instance by means of a clamping nut 92. With the upper end of the arm 89 is connected rigidly an approximately horizontal arm 93 carrying a weight 94, preferably slidable along said arm for adjustment and normally locked thereto, as by a set screw 95. It will be readily understood that the weighted lever 93, 89 tends to force the section 25$^a$ and 25$^b$ outwardly to press their lugs 57 into good frictional engagement with the heads of the rails 28, 28' respectively. The adjustment of the carrier 91 is for the purpose of enabling the instrument to be set to tracks of different gauges. The end of the bar 83 adjacent to the section 25ᵇ is connected rigidly, as at 96, with the forked end 97 of a diagonal brace 98, the other end of which is secured rigidly, as at 99, to a bracket 100 on a longitudinal bar 101 connecting the sections 25ᵃ, 25ᶜ and secured thereto at 102 and 103 respectively. The sections 25ᵃ, 25ᶜ are thus connected by a sort of triangular brace formed by the parts 101, 83, 97 and 98, and a strong construction is thus obtained. The connections at 84, 96, 98, 102 and 103 are preferably of a detachable character (screw and nut), so as to facilitate dismembering, shipping, and assembling the instrument. The section 25ᵃ, which carries the marker 72, may be provided with weights 104 to insure better contact with the rail 28. Hooks 32, 32′ for attaching traction members 31, 31′ respectively, are provided at the forward end of the section 25ᵃ and on the bar 83 adjacent to its connection with the diagonal brace 97, 98.

Figure 15:
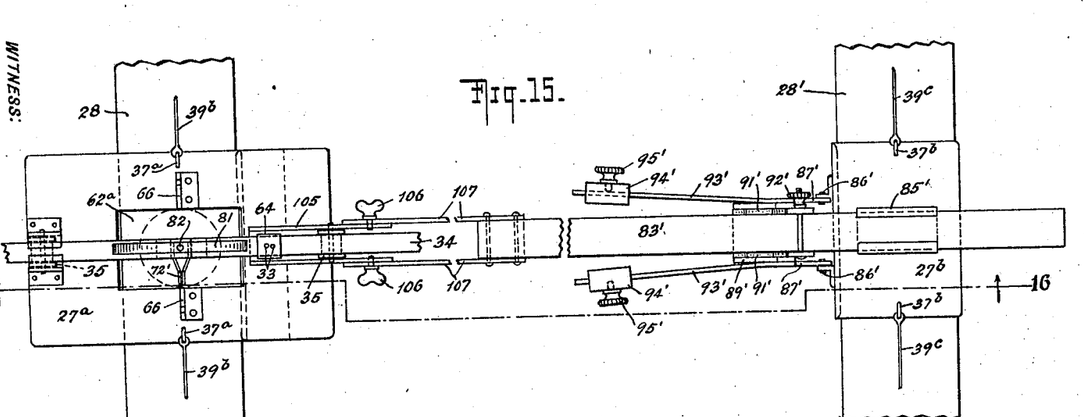
Fig. 15 is a plan view and Fig. 16 is a vertical section on line 16—16 of Fig. 15, showing the intermediate member employed in conjunction with the end members shown in Figs. 13 and 14.
Figure 16:
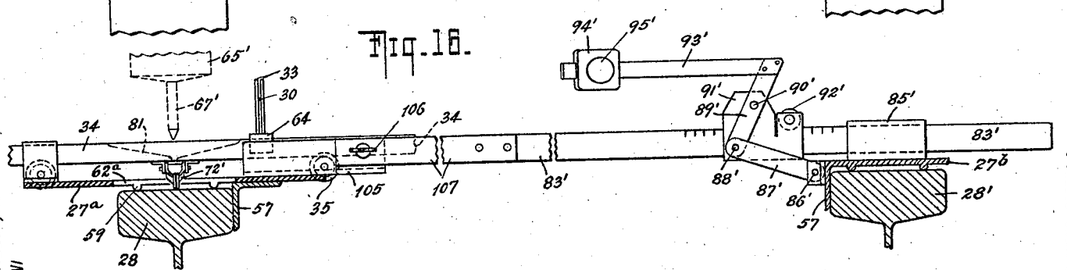

The intermediate member shown in Figs. 12, 15 and 16 has two sections 27ᵃ and 27ᵇ adapted to travel abreast on the rails 28, 28′ respectively. These sections are pressed apart by mechanism of the same character as described above with reference to Figs. 13 and 14, and the marking device is substantially the same as in Figs. 9, 10 and 11; all this will be apparent from the use of similar reference numerals. The section 27ᵃ has a transverse channel portion 105 containing one of the flanged rollers 35 on which the indicating member 34 travels. With said portion 105 is connected, as by clamping wing screws 106, the forked end 107 of a transverse bar 83′ having the same arrangement and function, substantially, as the bar 83 of the end members. The connection at 106 is such as to allow the two parts 105, 83′ to be detached from each other, or swung on the screws 106 as a pivot, when said screws are loosened; in either case, transportation and installation of the instrument are facilitated.

The other end member (being the rear member, in the use assumed in Fig. 12), consists of three sections 26ᵃ, 26ᵇ, 26ᶜ, of the same construction as explained in conjunction with the front member 25ᵃ, 25ᵇ, 25ᶜ. The sections 25ᵃ and 26ᵃ of the two members are connected by a wire or other rectilinear connecting member 30, of the same character as before.

At the ends nearest to the intermediate member the sections 25ᵃ, 25ᵇ, 26ᵃ, 26ᵇ are provided with hooks 38, 38′ for connection with wires or the like 39ᵇ, 39ᶜ, respectively, leading to hooks 37ᵃ, 37ᵇ, respectively, on the sections 27ᵃ, 27ᵇ, respectively, of the intermediate member. As shown, such wires 39ᵇ, 39ᶜ may extend both forward and rearward from the intermediate member to the respective end members; it would, of course, suffice to use such wires only between the intermediate member and the end member which, at the time, is the forward member, and to transfer such wires to the other side of the intermediate member whenever the direction in which the instrument travels is to be reversed. This remark will also apply to the construction shown in Figs. 6 to 11.

With reference to Figs. 15 and 16, I will repeat the remark made in connection with Figs. 9, 10 and 11, that the intermediate member might be provided with a traveling strip (such as 46 in Figs. 2 to 5) on which the marker 72′ would trace a line instead of marking the rail 28.

Various modifications may be made without departing from the nature of my invention as set forth in the appended claims.

I claim:

1. A device of the class described, comprising two end members adapted to move along a track, a substantially rectilinear connecting member extending from one of said end members to the other, an intermediate member likewise adapted to move along the track, means for causing said intermediate member to move together with said end members, and an indicating member movable transversely relatively to said intermediate member and engaging said connecting member.

2. A device of the class described, comprising two end members adapted to move along a track, a substantially rectilinear connecting member extending from one of said end members to the other, an intermediate member likewise adapted to move along the track, means for causing said intermediate member to move together with said end members, and an indicating member carried by said intermediate member and slidable thereon transversely, and engaging said connecting member.

3. A device of the class described, comprising two end members and an intermediate member, all three connected to move in unison, yet each free to move relatively to the others sufficiently to enable the device to follow a curved track, a substantially rectilinear connecting member extending from one of said end members to the other, and an indicating member carried by said intermediate member and movable relatively thereto transversely, and engaging said connecting member.

4. A device of the class described, comprising two end members and an intermediate member arranged in tandem fashion and adapted to move along a track, each of said members being free to move relatively to the others sufficiently to enable the device to follow a curved track, a substantially rectilinear connecting member extending from one of said end members to the other, means for causing said intermediate member to move lengthwise of the track, and an indicating member carried by said intermediate member and movable relatively thereto transversely, and engaging said connecting member.

5. A device of the class described, comprising two end members and an intermediate member arranged in tandem fashion and adapted to move along a track, each of said members being free to move relatively to the others sufficiently to enable the device to follow a curved track, a substantially rectilinear connecting member extending from one of said end members to the other, means for causing said intermediate member to move lengthwise of the track, and an indicating member carried by said intermediate member and movable relatively thereto transversely, and having two upright pins engaging said connecting member on opposite sides.

6. A device of the class described, comprising two end members and an intermediate member arranged in tandem fashion and adapted to move along a track, each of said members being free to move relatively to the others sufficiently to enable the device to follow a curved track, a substantially rectilinear connecting member extending from one of said end members to the other, means for causing said intermediate member to move lengthwise of the track, and an indicating member carried by said intermediate member and movable relatively thereto transversely, and having a marker and a guide which are relatively adjustable to different distances from each other lengthwise of said indicating member, said guide engaging said connecting member.

7. A device of the class described, comprising two end members and an intermediate member arranged in tandem fashion and adapted to move along a track, each of said members being free to move relatively to the others sufficiently to enable the device to follow a curved track, a substantially rectilinear connecting member extending from one of said end members to the other, means for causing said intermediate member to move lengthwise of the track, an indicating member carried by said intermediate member and movable relatively thereto transversely, and engaging said connecting member, a marker carried by said indicating member, and another marker carried by one of said end members.

8. A device of the class described, comprising two end members and an intermediate member arranged in tandem fashion and adapted to move along a track, each of said members being free to move relatively to the others sufficiently to enable the device to follow a curved track, a substantially rectilinear connecting member extending from one of said end members to the other, means for causing said intermediate member to move lengthwise of the track, an indicating member carried by said intermediate member and movable relatively thereto transversely, and engaging said connecting member, and a marker carried by said indicating member and suspended therefrom pivotally to swing about an axis extending transversely of the said intermediate member.

9. A device of the class described, comprising a member movable along a track, and a marker carried by said member and movable pivotally about an axis transverse to the path of said member.

10. A device of the class described, comprising a member movable along a track, a trough-like marker carried by said member and movable pivotally about an axis transverse to the path of said member, and a tank carried by said member and arranged to deliver a marking fluid to said trough-like marker.

11. A device of the class described, comprising a member movable along a track, an invertible marker functioning in either of its positions and carried by said member pivotally to swing for inversion about an axis transverse to the path of said member, and a tank carried by said member and arranged to deliver a marking fluid to said marker in either position thereof.

12. A device of the class described, comprising end members and an intermediate member arranged in tandem fashion to travel on a track, each of said members comprising sections arranged to travel on different rails, means for causing the intermediate member to travel with the end members, a member connecting said end members, and an indicating member movable transversely on the intermediate member and engaging said connecting member.

13. A device of the class described, comprising end members and an intermediate member adapted to travel on a track in tandem arrangement, each of said members comprising sections adapted to move on different rails and connected with each other, means tending to press such sections transversely in opposite directions into good contact with the rails, means for causing the intermediate member to travel with the end members, a member connecting the end members, and an indicating member movable transversely on the intermediate member and engaging said connecting member.

14. A device of the class described, comprising end members and an intermediate member adapted to travel on a track in tandem arrangement, each of said end members comprising two sections adapted to travel in tandem arrangement on the same rail, a third section adapted to travel on the other rail, and a triangular frame connecting said sections, means for causing the intermediate member to travel with the end members, a member connecting the end members, and an indicating member movable transversely on the intermediate member and engaging said connecting member.

15. A device of the class described, comprising end members and an intermediate member adapted to travel on a track in tandem arrangement, each of said end members comprising two sections adapted to travel in tandem arrangement on the same rail, a triangular frame connecting said sections and including a transverse member extending to the other rail, a third section slidable along said transverse member and adapted to travel on such other rail, means for moving the sections relatively to each other transversely to press them against the respective rails, means for causing the intermediate member to travel with the end members, a member connecting the end members, and an indicating member movable transversely on the intermediate member and engaging said connecting member.

In testimony whereof I have hereunto set my hand.

WALTER WAFFENSCHMIDT.